United States Patent
Rezaie et al.

(10) Patent No.: US 12,237,899 B2
(45) Date of Patent: Feb. 25, 2025

(54) METHOD AND DEVICE

(71) Applicant: Nokia Solutions and Networks Oy, Espoo (FI)

(72) Inventors: Sajad Rezaie, Aalborg (DK); Oana-Elena Barbu, Aalborg (DK)

(73) Assignee: Nokia Solutions and Networks Oy, Espoo (FI)

(*) Notice: Subject to any disclaimer, the term of this patent is extended or adjusted under 35 U.S.C. 154(b) by 0 days.

(21) Appl. No.: 18/625,409

(22) Filed: Apr. 3, 2024

(65) Prior Publication Data

US 2024/0340057 A1    Oct. 10, 2024

(30) Foreign Application Priority Data

Apr. 5, 2023   (FI) ..................................... 20235390

(51) Int. Cl.
    *H04L 23/02*   (2006.01)
    *H04B 7/06*    (2006.01)
    *H04L 25/02*   (2006.01)

(52) U.S. Cl.
    CPC ....... *H04B 7/0626* (2013.01); *H04L 25/0254* (2013.01)

(58) Field of Classification Search
    CPC ........ G06N 20/00; G06N 3/0455; G06N 3/08; H04B 7/0417; H04B 7/0626;
    (Continued)

(56) References Cited

U.S. PATENT DOCUMENTS

| | | | |
|---|---|---|---|
| 2021/0273706 A1* | 9/2021 | Zeng | ..................... H04B 7/0486 |
| 2022/0338189 A1* | 10/2022 | Madadi | ................... H04B 17/24 |
| 2023/0412227 A1* | 12/2023 | Abebe | .................. H04B 7/0626 |
| 2023/0412230 A1* | 12/2023 | Saber | ..................... G06N 20/10 |

(Continued)

FOREIGN PATENT DOCUMENTS

| | | |
|---|---|---|
| WO | WO 2022/123259 A1 | 6/2022 |
| WO | WO-2023/274926 A1 | 1/2023 |

(Continued)

OTHER PUBLICATIONS

Nokia et al., "Other aspects on AI/ML for CSI feedback enhancement," 3GPP TSG RAN WG1 #112 Meeting, R1-2300605, Athens, Greece, Feb. 27-Mar. 3, 2023.

(Continued)

*Primary Examiner* — Khai Tran
(74) *Attorney, Agent, or Firm* — McCarter & English, LLP

(57) ABSTRACT

A device for reconstructing a channel state information (C) and a method of reconstructing a channel state information, wherein the device for reconstructing includes circuitry for reconstructing the channel state information depending (C) on a first encoding ($T_m$) of the channel state information (C) understandable by a first decoder, and determining the first encoding ($T_m$) depending on a second encoding ($W_1, \ldots, W_M$) of the channel state information (C) understandable by a second decoder. A device for encoding a channel state information and a method of encoding a channel state information, wherein the device for encoding includes circuitry for determining a first encoding of the channel state information understandable by an encoder, determining a second encoding of the channel state information understandable by a decoder depending on the first encoding.

16 Claims, 10 Drawing Sheets

(58) Field of Classification Search
CPC ... H04B 7/0639; H04B 7/0658; H04L 1/0026; H04L 1/0041; H04L 25/0254; H04W 24/10
USPC .......................................... 375/262, 160, 267
See application file for complete search history.

(56) References Cited

U.S. PATENT DOCUMENTS

| | | | |
|---|---|---|---|
| 2024/0048207 A1 | 2/2024 | Park et al. | 7/636 |
| 2024/0056142 A1* | 2/2024 | Wang | H04B 7/0617 |
| 2024/0202542 A1* | 6/2024 | Lindbom | G06N 3/045 |

FOREIGN PATENT DOCUMENTS

| | | | |
|---|---|---|---|
| WO | WO-2024/049338 A1 | 3/2024 | |
| WO | WO-2024/102044 A1 | 5/2024 | |

OTHER PUBLICATIONS

Mediatek Inc., "Other aspects on AI/ML for CSI feedback enhancement," 3GPP TSG-RAN WG1 Meeting #111, R1-2212227, Toulouse, France, Nov. 14-18, 2022.

Nokia et al., "Other aspects on AI/ML for CSI feedback enhancement," 3GPP TSG RAN WG1 #112bis-e, R1-2302629, Apr. 17-Apr. 26, 2023.

"Discussions on AI-CSI", Ericsson, 3GPP TSG-RAN WGI Meeting #110, R1-2206884, Aug. 2022, 14 pages.

"General aspects of AI PHY", Ericsson, 3GPP TSG-RAN WG1 Meeting #109-e, R1-2203280, May 2022, 19 pages.

* cited by examiner

METHOD AND DEVICE

FIELD OF THE DISCLOSURE

The disclosure relates to a method and a device.

BACKGROUND

Channel state information (CSI) is used for precoding in massive multiple-input multiple-output (MIMO) communications with frequency division duplex (FDD) schemes. A downlink CSI is estimated by a user equipment (UE). The UE shares the downlink CSI with a next generation node B (gNB). The gNB uses the CSI to obtain higher signal-to-noise-ratio (SNR) and channel capacity.

SUMMARY

Various aspects of the disclosure are set out by the independent claims.

A method of reconstructing a CSI comprises reconstructing the CSI depending on a first encoding of the CSI understandable by a first decoder, and determining the first encoding depending on a second encoding of the CSI understandable by a second decoder. Executed by a gNB of a first vendor in a UE first training, the method translates information for a gNB of a second vendor, i.e. the second encoding understandable by the second decoder, to information for the gNB of the first vendor, i.e. the first encoding understandable by the first decoder. The method reconstructs the CSI using the first encoding.

According to some example embodiments, the method comprises obtaining a model for determining the first encoding with a loss that depends on the first encoding and a reference for the first encoding. The model represents a translator for translating information from a UE of the second vendor, i.e. information that is intended for use by the gNB of the second vendor to information for the gNB of the first vendor.

According to some example embodiments, the method comprises receiving a reference for the CSI and determining the reference for the first encoding depending on the reference for the CSI. At the gNB of the first vendor, the reference is determined, e.g., with a nominal encoder. Based on the received reference for the CSI, a training of the model uses a vendor independent reference for the CSI.

According to some example embodiments, determining the reference for the first encoding comprises encoding the reference for the CSI understandable by the first decoder.

According to some example embodiments, the method comprises receiving the second encoding or receiving a quantized second encoding and determining the second encoding depending on the quantized second encoding.

A method of encoding a CSI comprises determining a first encoding of the CSI understandable by an encoder, determining a second encoding of the CSI understandable by a decoder depending on the first encoding. Executed in a gNB first training by a UE of a first vendor, the method compresses the CSI to information for a gNB of the first vendor, i.e. the first encoding understandable by the encoder. The method translates the first encoding to information for a gNB of a second vendor, i.e. the second encoding understandable by the decoder.

According to some example embodiments, the method comprises obtaining a model for determining the second encoding with a loss that depends on the second encoding and a reference for the second encoding. The model represents a translator for translating information for the gNB of the first vendor to information for the gNB of the second vendor.

According to some example embodiments, the method comprises determining or receiving the CSI and determining the first encoding depending on the CSI. In the UE of the first vendor, the CSI is either determined by the UE or received by the UE. In the UE of the first vendor the CSI is encoded with an encoder. Based on the determined CSI, a training of the model uses the CSI determined by the UE of the first vendor. Based on the received CSI, a training of the model uses a vendor independent CSI.

According to some example embodiments, the method comprises either receiving the reference for the second encoding or receiving a quantized reference for the second encoding and determining the reference for the second encoding depending on the quantized reference.

According to some example embodiments, the method comprises sending the second encoding or quantizing the second encoding and sending the quantized second encoding.

A device for reconstructing a CSI comprises means for reconstructing the CSI depending on a first encoding of the CSI understandable by a first decoder, and determining the first encoding depending on a second encoding of the CSI understandable by a second decoder.

According to some example embodiments, the device for reconstructing the CSI comprises means for obtaining a model for determining the first encoding with a loss that depends on the first encoding and a reference for the first encoding.

According to some example embodiments, the device for reconstructing the CSI comprises means for receiving a reference for the CSI and determining the reference for the first encoding depending on the reference for the CSI.

According to some example embodiments, determining the reference for the first encoding comprises encoding the reference for the CSI understandable by the first decoder.

According to some example embodiments, the device for reconstructing the CSI comprises means for receiving the second encoding or means for receiving a quantized second encoding and determining the second encoding depending on the quantized second encoding.

A device for encoding a CSI comprises means for determining a first encoding of the CSI understandable by an encoder, and determining a second encoding of the CSI understandable by a decoder depending on the first encoding.

According to some example embodiments, the device for encoding the CSI comprises means for obtaining a model for determining the second encoding with a loss that depends on the second encoding and a reference for the second encoding.

According to some example embodiments, the device for encoding the CSI comprises means for determining or receiving the CSI and determining the first encoding depending on the CSI.

According to some example embodiments, the device for encoding the CSI comprises means for receiving the reference for the second encoding or means for receiving a quantized reference for the second encoding and determining the reference for the second encoding depending on the quantized reference.

According to some example embodiments, the device comprises means for sending the second encoding or quantizing the second encoding and sending the quantized second encoding.

A first apparatus, wherein the first apparatus comprises at least one processor and at least one memory storing instructions that, when executed by the at least one processor, cause the first apparatus at least to reconstruct a channel state information depending on a first encoding of the channel state information understandable by a first decoder, and determine the first encoding depending on a second encoding of the channel state information understandable by a second decoder.

The first apparatus, wherein the instructions, when executed by the at least one processor, cause the first apparatus to at least obtain a model for determining the first encoding with a loss that depends on the first encoding and a reference for the first encoding.

The first apparatus, wherein the instructions, when executed by the at least one processor, cause the first apparatus to at least receive a reference for the channel state information and determine the reference for the first encoding depending on the reference for the channel state information.

The first apparatus, wherein determining the reference for the first encoding comprises encoding the reference for the channel state information understandable by the first decoder.

The first apparatus, wherein the instructions, when executed by the at least one processor, cause the first apparatus to at least receive the second encoding or receive a quantized second encoding and determine the second encoding depending on the quantized second encoding.

A second apparatus, wherein the second apparatus comprises at least one processor and at least one memory storing instructions that, when executed by the at least one processor, cause the second apparatus at least to determine a first encoding of the channel state information understandable by an encoder, and determine a second encoding of the channel state information understandable by a decoder depending on the first encoding.

The second apparatus, wherein the instructions, when executed by the at least one processor, cause the second apparatus to at least obtain a model for determining the second encoding with a loss that depends on the second encoding and a reference for the second encoding.

The second apparatus, wherein the instructions, when executed by the at least one processor, cause the second apparatus to at least determine or receive the channel state information and determine the first encoding depending on the channel state information.

The second apparatus, wherein the instructions, when executed by the at least one processor, cause the second apparatus to at least receive the reference for the second encoding or receive a quantized reference for the second encoding and determine the reference for the second encoding depending on the quantized reference.

The second apparatus, wherein the instructions, when executed by the at least one processor, cause the second apparatus to at least send the second encoding or quantize the second encoding and send the quantized second encoding.

According to some example embodiment, a program comprises instructions to perform the method of reconstructing or the method of encoding.

According to some example embodiment, a non-transitory computer readable medium comprises the instructions.

DESCRIPTION OF THE EMBODIMENTS

Channel state information, CSI, is needed for precoding in massive multiple-input multiple-output, MIMO communications with frequency division duplex, FDD, schemes. Accurate CSI can be used by a base station, BS, to obtain higher signal-to-noise-ratio, SNR, and channel capacity. In FDD networks, the UE estimates the downlink CSI. The CSI is shared with the BS which introduces overhead to the network. The CSI is compressed by an encoder at the UE to an encoding of the CSI, which results in reducing the overhead. The quantization methods quantize the encoding of the CSI with an quantizer to a quantized encoding of the CSI at the UE and de-quantize the quantized encoding with a de-quantizer at the gNB to an encoding of the CSI. The gNB reconstructs the CSI from the information about the CSI with a decoder. To reduce the overhead, scalar or vector quantization methods are used. Vector quantization methods use codebooks that achieve a high compression rate, CR, i.e. ratio of compressed size to uncompressed size.

Figure 1:
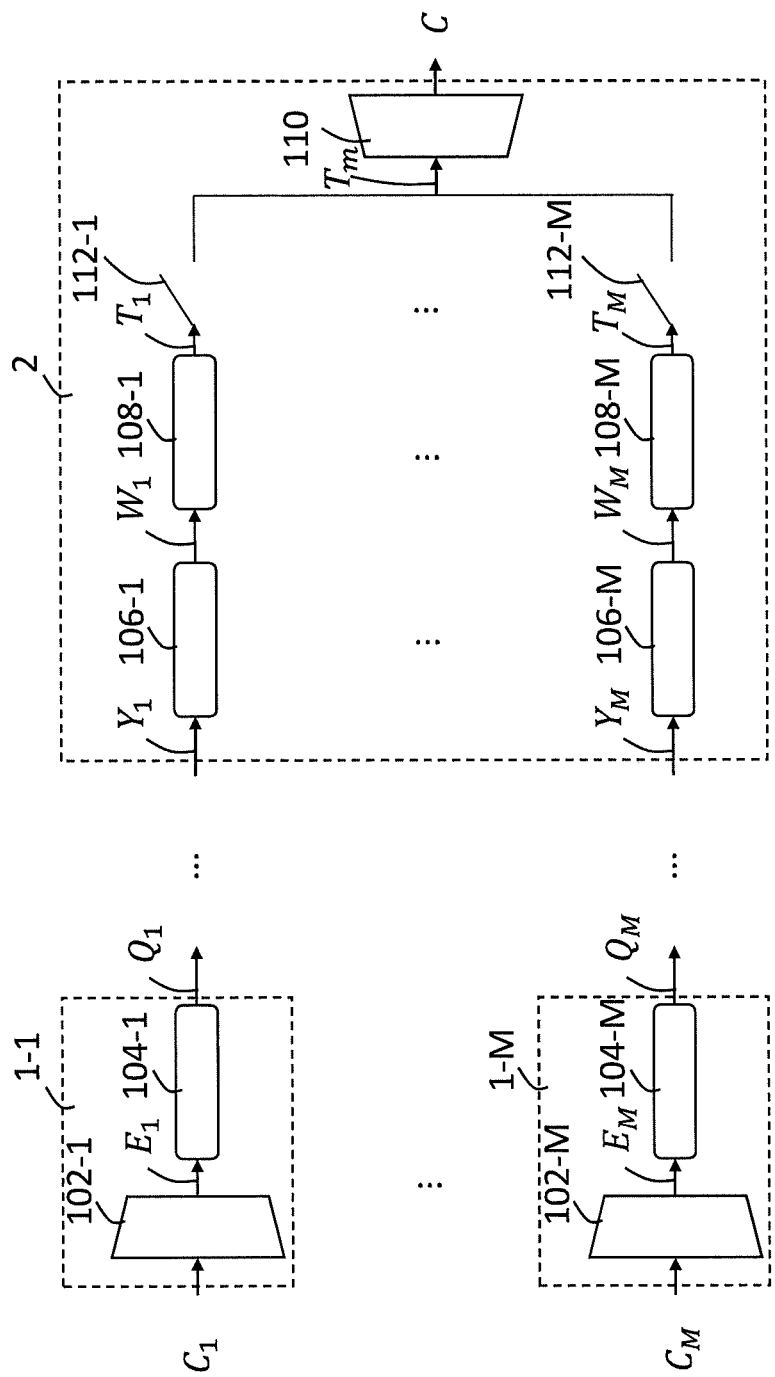
FIG. 1 schematically depicts a simplified block diagram of a scheme for UE first separate training, FIG. 2 schematically depicts a simplified block diagram of a scheme for gNB first separate training, FIG. 3 schematically depicts a first training of a UE for UE first separate training, FIG. 4 schematically depicts a first training of a gNB for UE first separate training, FIG. 5 schematically depicts a first supervised learning setup, FIG. 6 schematically depicts a second training of a gNB for gNB first separate training, FIG. 7 schematically depicts a second training of a UE for gNB first separate training, FIG. 8 schematically depicts a second supervised, FIG. 9 schematically depicts a method of reconstructing a CSI, FIG. 10 schematically depicts a method of encoding a CSI, FIG. 11 schematically depicts a first apparatus, FIG. 12 schematically depicts a second apparatus.

FIG. 1 schematically depicts a simplified block diagram of a scheme for UE first separate training.

A first UE 1-1 comprises a first encoder 102-1 that is configured to encode a first CSI G to a first encoding $E_1$ in a latent space of the first encoder 102-1. A M-th UE M comprises a M-th encoder 102-M that is configured to encode a M-th CSI $C_M$ to a M-th encoding $E_M$ in a latent space of the M-th encoder 102-M.

The first UE 1-1 comprises a first quantizer 106-1 that is configured to quantize the first encoding E to a first quantized encoding $Q_1$. The first UE 1-1 is configured to send the first quantized encoding $Q_1$ to the gNB 2.

The M-th UE 1-M comprises a M-th quantizer 106-M that is configured to quantize the M-th encoding $E_M$ to a M-th quantized encoding $Q_M$. The M-th UE 1-M is configured to send the M-th quantized encoding $Q_M$ to a gNB 2.

The gNB 2 is configured to receive a first quantized encoding $Y_1$ from the first UE 1-1. The gNB 2 is configured to receive a M-th quantized encoding $Y_M$ from the M-th UE 1-M.

The gNB 2 comprises a first de-quantizer 106-1 that is configured to de-quantize the first quantized encoding $Y_1$ to a first encoding $W_1$ in a latent space of a first decoder.

The gNB 2 comprises a M-th de-quantizer 106-M that is configured to de-quantize the M-th quantized encoding $Y_M$ to a M-th encoding $W_M$ in a latent space of a M-th decoder.

The gNB 2 comprises a first model 108-1 that is configured to translate the first encoding $W_1$ in the latent space of the first decoder to a first encoding $T_1$ in a latent space of a common decoder 110 of the gNB 2.

The gNB 2 comprises a M-th model 108-M that is configured to translate the M-th encoding $W_M$ in the latent space of the M-th decoder to a M-th encoding $T_M$ in the latent space of the common decoder 110.

The common decoder 110 is configured to reconstruct the CSI C from a m-th encoding $T_m$ in the latent space of the common decoder 110.

The gNB 2 comprises a selector that is configured to select the m-th encoding $T_m$ from the first encoding $T_1$ to M-th encoding $T_M$ in the latent space of the common decoder 110. The selector comprises switches 112-1, . . . , 112-M for selectively providing one of the first encoding $T_1$ to M-th encoding $T_M$ as the m-th encoding $T_m$ to the common decoder 110.

The models 108-1, . . . , 108-M in the gNB 2 represent translation blocks that map the encoding in a respective vendor specific latent space to a latent space of the common decoder 110 of the gNB.

Figure 2:
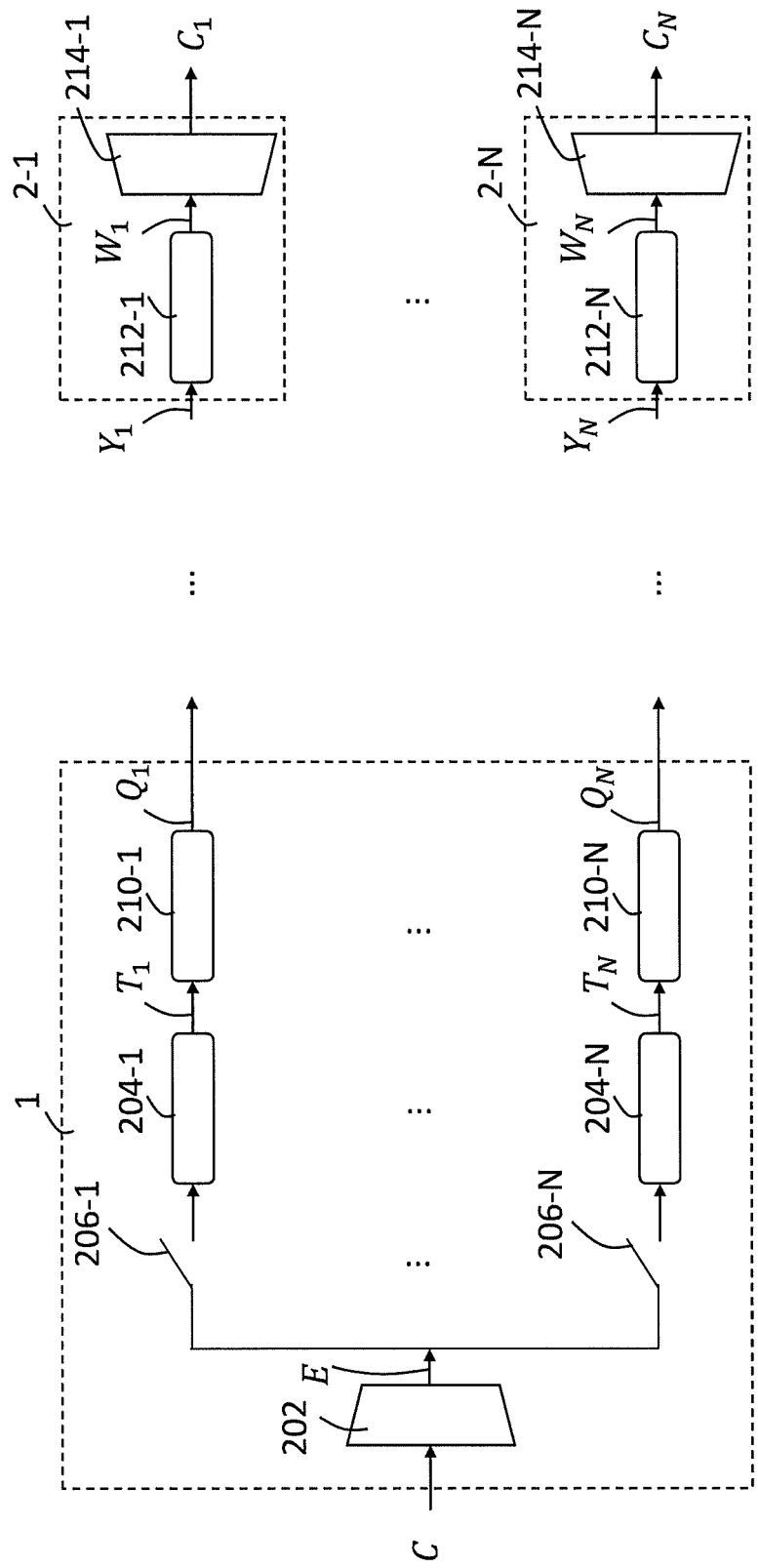

FIG. 2 schematically depicts a simplified block diagram of a scheme for gNB first separate training.

A UE 1 comprises a common encoder 202 that is configured to encode a CSI C to an encoding E in a latent space of the common encoder 202.

The UE 1 comprises a first model 204-1 that is configured to translate the encoding E in the latent space of the encoder 202 to a first encoding $T_1$ in a latent space of a first decoder.

The UE 1 comprises a selector that is configured to select the n-th model 204-n from the first model 204-1 to N-th model 204-N for translating. The selector comprises switches 206-1, . . . , 206-M for selectively providing the encoding E to the N-th model for translating.

The UE 1 comprises a first quantizer 210-1 that is configured to quantize the first encoding $T_1$ to a first quantized encoding $Q_1$. The UE 1 is configured to send the first quantized encoding $Q_1$ to a first gNB 2-1. The UE 1 comprises a N-th quantizer 210-N that is configured to quantize the N-th encoding $T_N$ to a n-th quantized encoding $Q_N$. The UE 1 is configured to send the N-th quantized encoding $Q_N$ to a N-th gNB 2-N.

The first gNB 2-1 is configured to receive a first quantized encoding $Y_1$ from the UE 1. The N-th gNB 2-N is configured to receive a N-th quantized encoding $Y_N$ from the UE 1.

The first gNB 2-1 comprises a first de-quantizer 212-1 that is configured to de-quantize the first quantized encoding $Y_1$ to a first encoding $W_1$ in a latent space of a first decoder 214-1. The N-th gNB 2-N comprises a N-th de-quantizer 212-N that is configured to de-quantize the N-th quantized encoding $Y_N$ to a N-th encoding $W_M$ in a latent space of a N-th decoder 214-N.

The first decoder 214-1 is configured to reconstruct a first CSI $C_1$ from the first encoding $W_1$ in the latent space of the first decoder 214-1. The N-th decoder 214-N is configured to reconstruct a N-th CSI $C_N$ from the N-th encoding $W_N$ in the latent space of the N-th decoder 214-N.

The models 204-1, . . . , 204-N in the UE 1 represent translation blocks that map the encoding in the latent space of the common encoder 202 of the UE 1 to the latent spaces that are understandable by respective vendor specific decoders.

The quantizers and de-quantizers are optional. A UE may be configured to map the encoding of the CSI with the selected model and share the resulting encoding with a predetermined gNB without quantizing. A gNB may be configured to receive the encoding of the CSI without quantizing from a predetermined UE and map the received encoding of the CSI with the selected model. A UE may be configured to share the resulting encoding of the CIS with some gNB without quantizing and to quantize the resulting encoding and share the quantized encoding with some gNB. A gNB may be configured to receive some encoding of the CIS from some UE without quantizing and to receive some quantized encoding of the CIS from some UE.

Some model may be based on machine learning, ML. Some models comprise a ML model. Some model may comprise a one layer neural network. Some model may comprise a deep neural network.

Some model may be obtained, e.g. trained, updated or fine tuned, vendor specific. In case a new encoder or decoder is provided e.g. by a new vendor, the UE or gNB may be provided a vendor specific model while the common encoder or decoder may remain unchanged.

The training comprises separate training at a network side, i.e. gNB side, and UE side. The UE-side comprises a CSI generation part and the network-side comprises a CSI reconstruction part. The sides are trained by UE side and network side, respectively.

In the UE first separate training by a vendor, a vendor specific encoder model is trained. UE vendors may consider different ML architectures for the encoder and potential nominal decoder, different quantization methods, and different quantization configurations including number of quantization bits for scalar or vector quantization.

Figure 3:
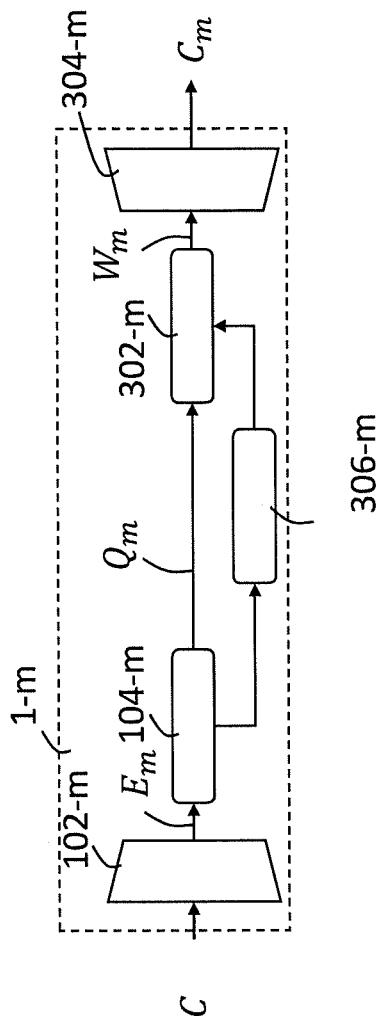

FIG. 3 schematically depicts the training of an m-th UE 1-m.

The m-th UE comprises an encoder 102-m for encoding the CSI C to an encoding $E_m$, a quantizer 104-m to map the encoding $E_m$ to a quantized encoding $Q_m$, a de-quantizer 302-m to map the quantized encoding $Q_m$ to a encoding $W_m$ in a latent space of a nominal decoder 304-m. The m-th UE quantizes and de-quantizes according to a quantization method 306-m.

The nominal decoder 304-m is an entity that the m-th UE uses for the training. The nominal decoder 304-m needs neither to be shared nor used in an inference phase.

Based on the m-th UE a dataset $\Xi_m$ that comprises $N_m$ samples is prepared. The dataset $\Xi_m$ may be shared with the gNB.

$$\Xi_m = \{(C^1, Q_m^1), (C^2, Q_m^2), \ldots, (C^{N_m}, Q_m^{N_m})\}$$

The dataset $\Xi_m$ comprises per sample i, a CSI $C^i$ that the encoder 102-m encodes to an encoding $E_m^i$ and a quantized encoding $Q_m^i$ of the encoding $E_m^i$.

The other UEs may be trained as described for the m-th UE.

Figure 4:
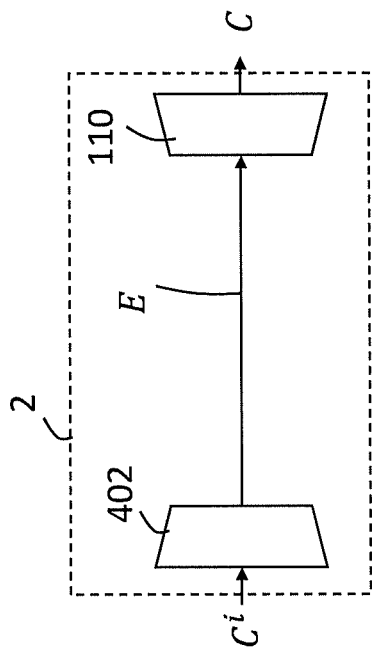

FIG. 4 schematically depicts the training of the gNB 2 based on a training data set for the gNB that comprises samples, wherein sample comprises a given CSI C' and a given reconstructed CSI C.

The gNB 2 comprises a nominal encoder 402 that is configured to map the given CSI $C^i$ to an encoding E. The gNB 2 comprises the common decoder 110. The common decoder 110 is configured to map the encoding E to the reconstructed CSI C.

The dataset $\Xi_m$ and the quantization method 306-m are shared for training the gNB. In the example, multiple datasets $\Xi_m$, m∈[1, . . . , M] are shared for training the gNB.

The training of the gNB 2 comprises training at least some of the models 108-1, . . . , 108-M that represent translation blocks of the gNB 2.

Figure 5:
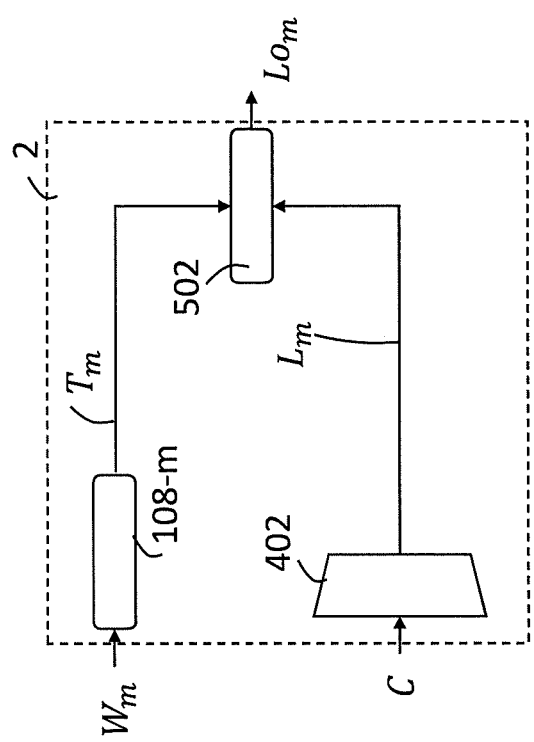

FIG. 5 schematically depicts a supervised learning setup for an m-th model 108-m and a sample i of the de-quantized encoding $W_m$ of a CSI C.

A training dataset $\Psi_m$ comprises per sample i and dataset $\Xi_m$, m∈ [1, . . . , M] a de-quantized encoding $W_m^i$ of a CSI $C^i$, and a label $L_m^i$ for the supervised training:

$$\Psi_m = \{(W_m^1, L_m^1), (W_m^2, L_m^2), (W_m^{N_m}, L_m^{N_m})\}$$

The label $L_m^i$ is in the example determined with the nominal encoder 402 from the CSI $C^i$. The CSI $C^i$ is for example the CSI $C^i$ from the dataset $\Xi_m$. The de-quantized encoding $W_m^i$ is for example determined with a m-th de-quantizer 106-m of the gNB 2 from the quantized encoding $Q_m^i$.

Some of the dataset $\Xi_m$ may comprise the encoding $E_m^i$ in the samples instead of the quantized encoding $Q_m^i$. The training of the m-th model 108-m in the gNB 2 may be based on the encoding $E_m^i$ as input for the m-th model 108-m instead of using the de-quantized encoding $W_m^i$.

The m-th model 108-m is trained with a loss function 502 that is configured to determine a loss $Lo_m$. The training may comprise gradient descent based on the loss $Lo_m$.

The other models that represent translation blocks of the gNB 2 may be trained as described for the m-th model 108-m.

The gNB 2 may comprise an input for an encoding of the CSI or a quantized encoding of the CSI that requires no translation because it is an encoding in the latent space of the common decoder 110.

In an inference phase, the UEs 1-1, . . . , 1-M use their respective encoder 104-1, . . . , 104-M to compress the respective CSI $C_1$, . . . , $C_M$ and the gNB 2 uses the UE-specific model 108-1, . . . , 108-M that corresponds to the respective UE 1-1, . . . , 1-M to determine the UE-specific encodings $W_1$, . . . , $W_M$ and to determine a respective translation to the encoding $T_1$, . . . , $T_M$ in the latent space that the common decoder 110 has learned.

In the gNB first separate training, specific decoder models are trained. eNB vendors may consider different ML architectures for the dencoder and potential nominal encoder, different quantization methods, and different quantization configurations including number of quantization bits for scalar or vector quantization.

Figure 6:
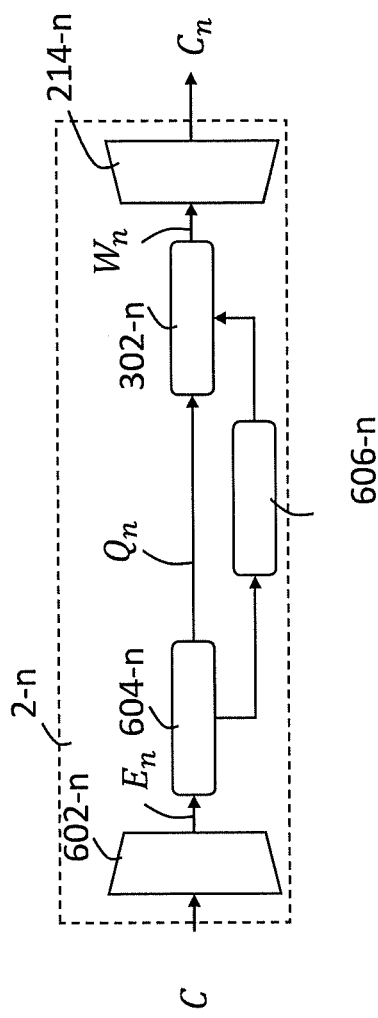

FIG. 6 schematically depicts the training of a n-th eNB 2-n.

The n-th eNB 2-n comprises a n-th nominal encoder 602-n for encoding a CSI C to an encoding $E_n$.

The n-th eNB 2-n comprises a quantizer 604-m to map the encoding $E_n$ to a quantized encoding $Q_n$, the de-quantizer 212-n to map the quantized encoding $Q_n$ to the encoding $W_n$ in the latent space of the m-th decoder 224-n for decoding an encoding $W_n$ of the CSI C to a reconstructed CSI $C_n$.

The n-th eNB 2-n quantizes and de-quantizes according to a quantization method 606-m.

The n-th nominal encoder 602-n is an entity that the n-th gNB uses for the training. The nominal encoder 602-n needs neither to be shared nor used in an inference phase.

Based on the n-th gNB a dataset $X_n$ that comprises $N_n$ samples is prepared. The dataset $X_n$ may be shared with the UE or the UEs.

$$X_n = \{(C^1, Q_n^1), (C^2, Q_n^2), \ldots, (C^{N_n}, Q_n^{N_n})\}$$

The dataset $X_n$ comprises per sample i, a CSI $C^i$ that the nominal encoder 602-m encodes to an encoding $E_n^i$ and a quantized encoding $Q_n^i$ of the encoding $E_n^i$.

The other eNBs may be trained as described for the n-th eNB.

Figure 7:
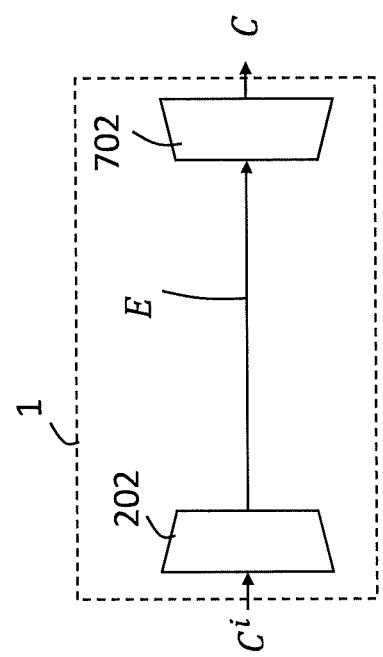

FIG. 7 schematically depicts the training of the UE 1 based on a training data set for the UE 1 that comprises samples, wherein sample comprises a given CSI $C^i$ and a given reconstructed CSI C.

The UE 1 comprises the encoder 202 that is configured to map the given CSI $C^i$ to an encoding E. The UE 1 comprises a nominal decoder 702. The nominal decoder 702 is configured to map the encoding E to the reconstructed CSI C.

The dataset $\chi_n$ and the quantization method 606-n are shared for training the UE 1. In the example, multiple datasets $\chi_n$, n∈ [1, . . . , N] are shared for training the UE. The training of the UE 1 comprises training at least some of the models 210-1, . . . , 210-N that represent translation blocks of the UE 1.

Figure 8:
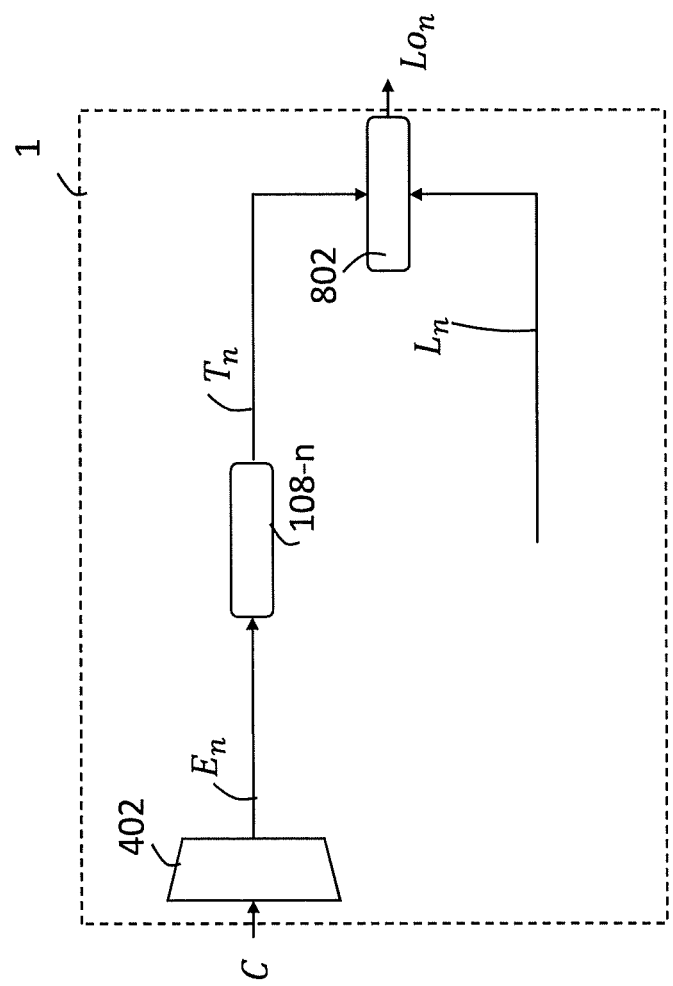

FIG. 8 schematically depicts a supervised learning setup for a n-th model 210-m and a sample i of the encoding $E_n$ of a CSI C.

A training dataset $\theta_n$ comprises per sample i and dataset $\chi_n$, n∈ [1, . . . , N] an encoding $E_n^i$ of a CSI $C^i$, and a label $L_n^i$ for the supervised training:

$$\theta_n = \{(E_n^1, L_n^1), (E_n^2, L_n^2), \ldots (E_n^{N_n}, L_n^{N_n})\}$$

The label $L_n^i$ is in the example determined from the dataset $\chi_n$. The label $L_n^i$ is for example the encoding $Q_n^i$ The CSI $C^i$ is for example the CSI $C^i$ from the dataset $\chi_n$.

The n-th model 108-n is trained with a loss function 802 that is configured to determine a loss $Lo_n$. The training may comprise gradient descent based on the loss $Lo_n$.

The other models that represent translation blocks of the gNB 2 may be trained as described for the n-th model 108-n.

The gNB 2 may comprise an input for an encoding of the CSI or a quantized encoding of the CSI that requires no translation because it is an encoding in the latent space of the common decoder 110.

In an inference phase, the UE 1 uses the common encoder 202 to compress the CSI C to the encoding E and then uses the gNB-specific model 204-1, . . . , 204-N to map the encoding E to a respective translation $T_1$, . . . , $T_N$ in the latent space of the decoder 214-1, . . . , 214-N of the respective gNB 2-1, . . . , 2-N.

Figure 9:
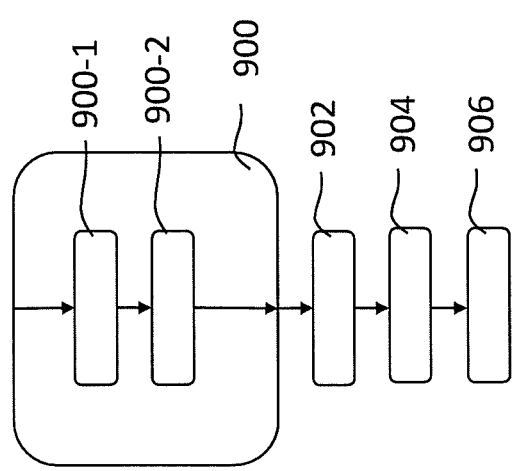

FIG. 9 schematically depicts a method of reconstructing a CSI.

The method of reconstructing is explained for m=1. The method may be applied accordingly to m=2, . . . , M.

The method of reconstructing comprises a step 900

The step 900 comprises training the model 108-1 for determining the encoding $T_1$ with the loss $Lo_1$ that depends on the encoding $T_1$ and a reference $L_1$ for the encoding ($T_1$.

The step 900 may comprise a step 900-1.

The step 900-1 comprises receiving a reference for the channel state information C.

The step 900 may comprise a step 900-2.

The step 900-2 comprises determining the reference L for the encoding $T_1$ depending on the reference for the channel state information C.

Determining the reference $L_1$ for the encoding $T_1$ may comprise encoding the reference for the channel state information C in the latent space for the first decoder 110.

The method of reconstructing comprises a step 902

The step 902 comprises receiving the encoding $W_1$ or receiving the quantized encoding Y and determining the encoding $W_1$ depending on the quantized encoding $Y_1$.

The method of reconstructing comprises a step 904.

The step 904 comprises reconstructing the channel state information C depending on the encoding $T_1$ of the channel state information C in the latent space for the first decoder 110.

The method of reconstructing comprises a step 906.

The step 906 comprises determining the encoding $T_1$ depending on the encoding $W_1$ of the channel state information C in the latent space for the second decoder 304-1.

Figure 10:
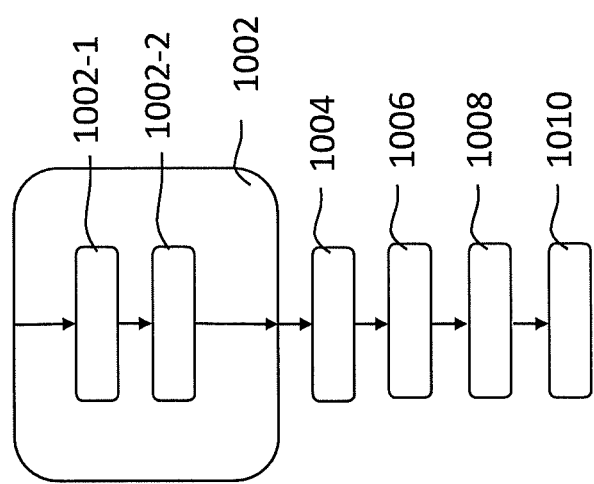

FIG. 10 schematically depicts a method of encoding a CSI C.

The method of encoding is explained for n=1. The method may be applied accordingly to n=2, . . . , N.

The method of encoding comprises a step 1002.

Step 1002 comprises determining t model 204-1 for determining the encoding $T_1$ with the loss $Lo_1$ that depends on the encoding $T_1$ and the reference $L_1$ for the encoding $T_1$.

The step 1002 may comprise receiving the reference $L_2$ for the encoding $T_1$.

The step 1002 may comprise a step 1002-1.

The step 1002-1 comprises receiving 1002-1 a quantized reference for the encoding $T_1$.

The step 1002 may comprise a step 1002-2.

The step 1002-2 comprises determining the reference $L_1$ for the encoding $T_1$ depending on the quantized reference.

The method of encoding comprises a step 1004.

Step 1004 comprises receiving 1004 the channel state information C. The method may comprise determining the channel state information C.

The method of encoding comprises a step 1006.

Step 1006 comprises determining the encoding E of the CSI C in the latent space of the encoder 202 depending on the channel state information C.

The method of encoding comprises a step 1008.

Step 1008 comprises determining the encoding $T_1$ of the CSI C in the latent space for the decoder 214-1 depending on the encoding E.

The method of encoding comprises a step 1010.

Step 1010 may comprise sending the encoding $T_1$.

The step 101 may comprise quantizing the encoding $T_1$ and sending the quantized encoding $Q_1$.

The methods may be configured to interact. For example, the method for encoding the channel state information C is executed in a UE to provide the encoding $T_1$ or the quantized encoding $Q_1$ to a gNB that executes the method for reconstructing the channel state information C.

The device 1 for reconstructing the channel state information C and the device 2 for encoding the channel state information C may be interoperable.

For example the device 2 for encoding the channel state information C is configured as described for one of the UEs 1-1, . . . , 1-M.

For example the device 1 for reconstructing the channel state information C is configured as described for one of the gNBs 2-1, . . . , 2-N.

In some examples, the nominal encoder and the common decoder or the common encoder and the nominal decoder are configured as autoencoder (AE) structure from deep learning (DL). In some examples, the encoder of the AE is configured for compression of CSI and the decoder of the AE is configured for reconstruction of CSI.

A program may comprise instructions to perform the method of reconstructing or the method of encoding.

A non-transitory computer readable medium may comprise the instructions.

The term "non-transitory," as used herein, is a limitation of the medium itself (i.e., tangible, not a signal) as opposed to a limitation on data storage persistency (e.g., RAM vs. ROM).

Figure 11:
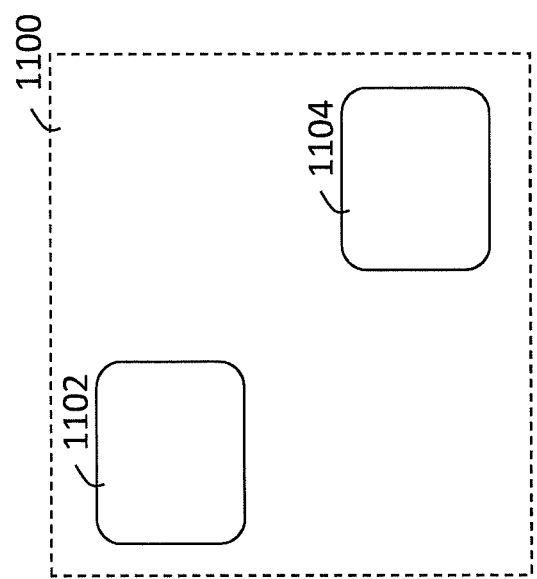

FIG. 11 schematically depicts a first apparatus 1100. The first apparatus 1100 is described by way of example for m=1 using the decoder 110, the encoding $T_1$, the decoder 304-1, the encoding $W_1$ and the model 108-1.

The first apparatus 1100 comprises at least one first processor 1102 and at least one first memory 1104. The at least one first memory 1104 comprises a non-transitory memory.

The at least one first memory 1104 stores instructions that, when executed by the at least one first processor 1102, cause the first apparatus 1100 at least to reconstruct the CSI C on the encoding $T_1$ of the CSI C in the latent space for the common decoder 110, and determine the encoding $T_1$ depending on the encoding $W_1$ of the CSI C in the latent space for the nominal decoder 304-1.

The instructions, when executed by the at least one first processor 1102, may cause the second apparatus 1100 to at least train the model 108-$m$ for determining the encoding $T_1$ with the loss $Lo_1$ that depends on the encoding $T_1$ and the reference $L_1$ for the encoding $T_m$.

The instructions, when executed by the at least one first processor 1102, may cause the second apparatus 1100 to at least receive a reference for the CSI C and determe the reference $L_1$ for the encoding $T_1$ depending on the reference for the CSI C.

The instructions, when executed by the at least one first processor 1102, may cause the second apparatus 1100 to at least receive the encoding $W_1$ or to receive the quantized encoding $Y_1$ and determine the encoding $W_1$ depending on the quantized encoding $Y_1$.

Figure 12:
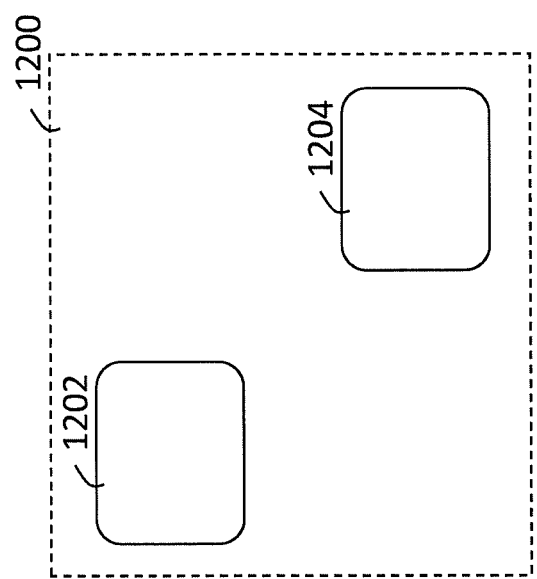

FIG. 12 schematically depicts a second apparatus 1200. The second apparatus 1200 is described by way of example for n=1 using the encoder 202, the encoding E, the decoder 214-1, the encoding $T_1$ and the model 204-1.

The second apparatus 1200 comprises at least one second processor 1202 and at least one second memory 1204.

The at least one second memory 1204 comprises a non-transitory memory.

The at least one second memory 1204 stores instructions that, when executed by the at least one second processor 1202, cause the second apparatus 1200 at least to determine the first encoding E of the CSI C in the latent space of the encoder 202, and determine the encoding $T_1$ of the CSI C in the latent space for the decoder 214-1 depending on the encoding E.

The instructions, when executed by the at least one second processor 1202, may cause the second apparatus 1200 to train the model 204-1 for determining the encoding $T_1$ with the loss $Lo_1$ that depends on the encoding $T_1$ and a reference $L_1$ for the encoding $T_1$.

The instructions, when executed by the at least one second processor 1202, may cause the second apparatus 1200 to determine or receive the CSI C and determine the encoding E depending on the CSI C.

The instructions, when executed by the at least one second processor 1202, may cause the second apparatus 1200 to receive the reference $L_1$ for the encoding $T_1$ or to receive a quantized reference for the encoding $T_1$ and determine the reference $L_1$ for the encoding $T_1$ depending on the quantized reference.

The instructions, when executed by the at least one second processor 1202, may cause the second apparatus 1200 send the encoding $T_1$ or quantize the encoding $T_1$ and send the quantized encoding $Q_1$.

According to the description, an encoding in a latent space of an encoder is an output of the encoder that is understandable by a corresponding decoder. A vendor specific output of a vendor specific encoder may be understandable by a vendor specific decoder.

According to the description, an encoding in a latent space of a decoder is an input of the decoder that is understandable by the decoder. A vendor specific encoder may produce a vendor specific input of a vendor specific decoder.

The invention claimed is:

1. A method of reconstructing a channel state information, wherein the method comprises:
   reconstructing the channel state information depending on a first encoding of the channel state information understandable with a first decoder;
   receiving a reference for the channel state information;
   determining the first encoding with a loss that depends on the first encoding and a reference for the first encoding, and determining the reference for the first encoding depending on the reference for the channel state information; and
   determining the first encoding depending on a second encoding of the channel state information understandable with a second decoder.

2. The method according to claim 1, wherein the method comprises obtaining and using a model for determining the first encoding with the loss that depends on the first encoding and with the reference for the first encoding.

3. The method according to claim 1, wherein determining the reference for the first encoding comprises encoding the reference for the channel state information understandable with the first decoder.

4. The method according to claim 1, wherein the method comprises receiving the second encoding or receiving a quantized second encoding and determining the second encoding depending on the quantized second encoding.

5. A method of encoding a channel state information, wherein the method comprises:
   determining channel state information;
   determining a first encoding of the channel state information understandable with an encoder, wherein determining the first encoding comprises determining the first encoding depending on the channel state information; and
   determining a second encoding of the channel state information understandable with a decoder depending on the first encoding.

6. The method according to claim 5, wherein the method comprises obtaining and using a model for determining the second encoding with a loss that depends on the second encoding and a reference for the second encoding.

7. The method according to claim 5, wherein the method comprises either receiving a reference for the second encoding or receiving a quantized reference for the second encoding and determining the reference for the second encoding depending on the quantized reference.

8. The method according to claim 5, wherein the method comprises sending the second encoding or quantizing the second encoding and sending the quantized second encoding.

9. A device for reconstructing a channel state information, wherein the device comprises;
   at least one processor; and
   at least one memory storing instructions that, when executed by the at least one processor, cause the device to perform at least the following;
   reconstructing the channel state information depending on a first encoding of the channel state information understandable with a first decoder;
   receiving a reference for the channel state information;
   determining the first encoding with a loss that depends on the first encoding and a reference for the first encoding, and determining the reference for the first encoding depending on the reference for the channel state information; and
   determining the first encoding depending on a second encoding of the channel state information understandable with a second decoder.

10. The device according to claim 9, wherein the at least one memory stores instructions that, when executed by the at least one processor, cause the device to perform at least the following: obtaining and using a model for determining the first encoding with the loss that depends on the first encoding and the reference for the first encoding.

11. The device according to claim 9, wherein determining the reference for the first encoding comprises encoding the reference for the channel state information understandable with the first decoder.

12. The device according to claim 9, wherein the at least one memory stores instructions that, when executed by the at least one processor the device to perform at least the following: receiving the second encoding or receiving a quantized second encoding and determining the second encoding depending on the quantized second encoding.

13. A device for encoding a channel state information, wherein the device comprises;
   at least one processor; and
   at least one memory storing instructions that, when executed by the at least one processor, cause the device to perform at least the following;
   determining or receiving the channel state information;
   determining a first encoding of the channel state information understandable with an encoder, wherein determining the first encoding comprises determining the first encoding depending on the channel state information; and
   determining a second encoding of the channel state information understandable with a decoder depending on the first encoding.

14. The device according to claim 13, wherein the stores instructions that, when executed by the at least one processor, cause the device to perform at least the following: obtaining a model for determining the second encoding with a loss that depends on the second encoding and a reference for the second encoding.

15. The device according to claim 13, wherein the at least one memory stores instructions that, when executed by the at least one processor, cause the device to perform at least the following: receiving a reference for the second encoding or receiving a quantized reference for the second encoding and determining the reference for the second encoding depending on the quantized reference.

16. The device according to claim 13, wherein the at least one memory stores instructions that, when executed by the at least one processor, cause the device to perform at least the following: sending the second encoding or quantizing the second encoding and sending the quantized second encoding.

\* \* \* \* \*